Dec. 5, 1972    E. MARTINEZ    3,705,105
MOVING PICTURE FILM VIEWER EDITOR

Filed June 21, 1971    5 Sheets-Sheet 1

INVENTOR.
EUGENE MARTINEZ
BY
J.B. Felshin
ATTORNEY

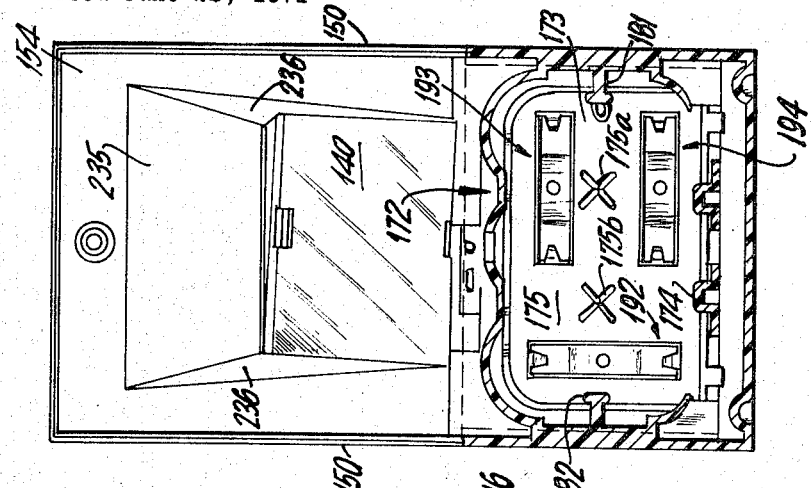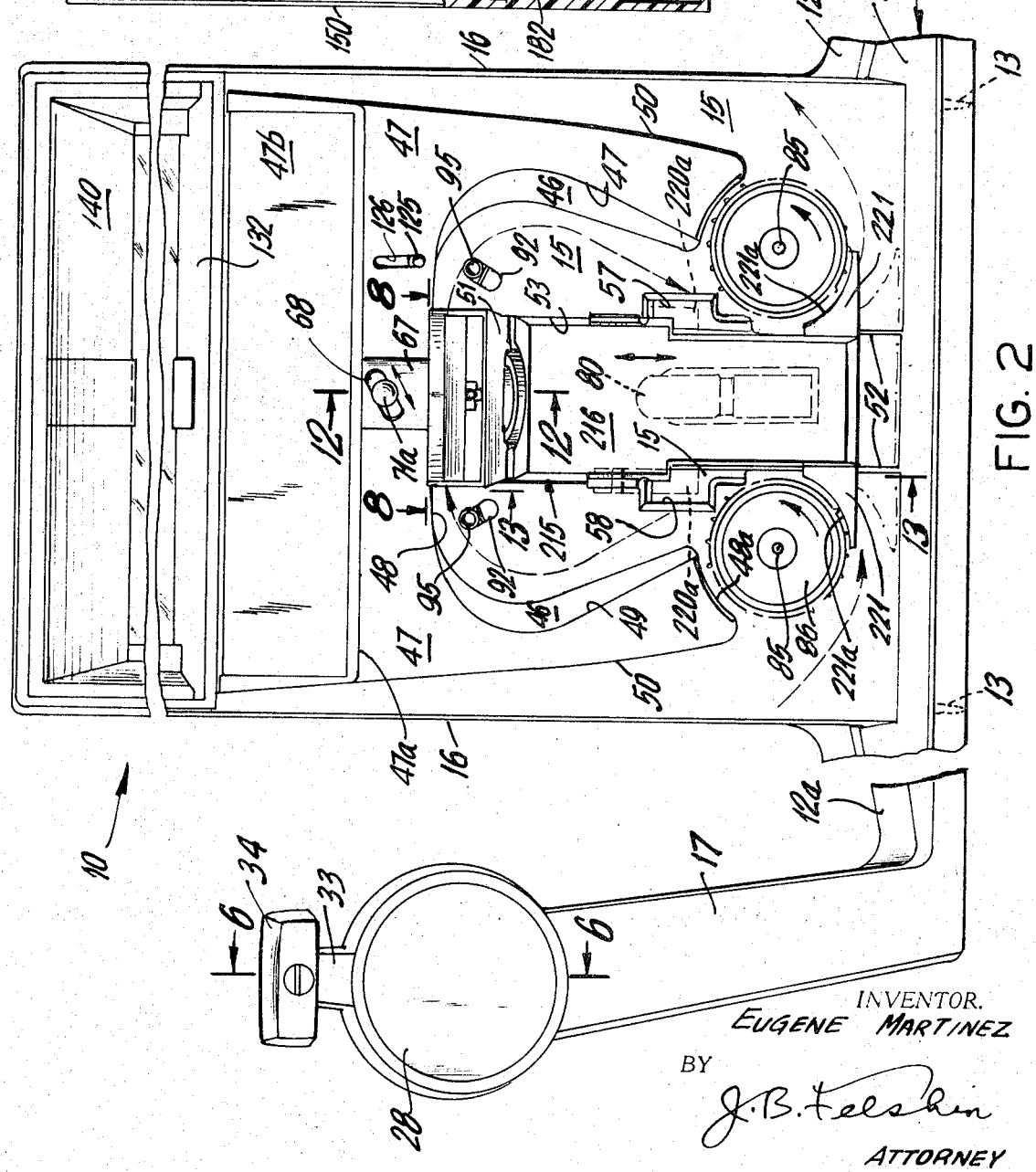

Dec. 5, 1972 E. MARTINEZ 3,705,105
MOVING PICTURE FILM VIEWER EDITOR
Filed June 21, 1971 5 Sheets-Sheet 4

INVENTOR.
EUGENE MARTINEZ
BY
J. B. Felshin
ATTORNEY

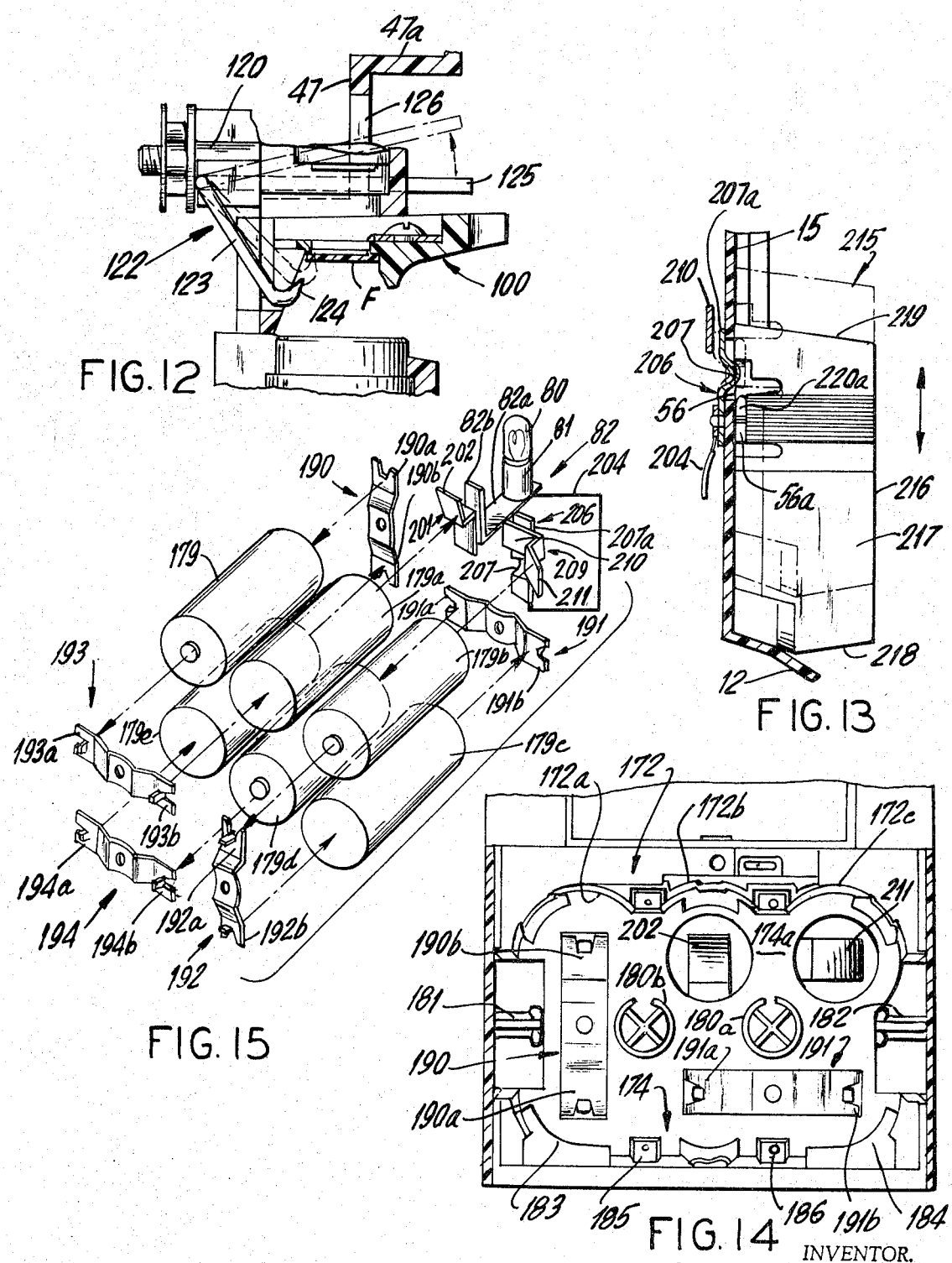

United States Patent Office 3,705,105
Patented Dec. 5, 1972

3,705,105
MOVING PICTURE FILM VIEWER EDITOR
Eugene Martinez, Irvington-on-Hudson, N.Y., assignor of a fractional part interest to Robert H. Reible, Croton-on-Hudson, N.Y.
Filed June 21, 1971, Ser. No. 154,858
Int. Cl. G03b 21/00
U.S. Cl. 352—129
32 Claims

ABSTRACT OF THE DISCLOSURE

Idler gears isolate film loop and preserve the integrity of the isolated film loop. Film image locating means are movable in order to index the image on the screen properly. The projection lamp cover or housing is also the "on/off" switch and film guide for the idler gears. The front portion of the housing contains the positioning devices for the condenser lens assembly, the lamp, the focusing lens, two of the mirrors of the optical system and the screen. The rear portion of the housing contains positioning devices for the third mirror of the optical system and the battery storage compartment. The battery storage compartment is so designed that the pickup contacts for electrical current are on the front portion of the housing while all other contacts are on the rear portion of the housing and on the battery compartment cover, thereby eliminating the need for electrical interlock wiring between both halves of the housing.

---

This invention relates to a moving picture film viewer/editor.

An object of this invention is to provide apparatus of the character described wherein an intermittent motion mechanism comprises an isolated film loop created by the two idler gears which are connected by a third gear therebetween, thereby preserving a fixed relationship between both idlers, which in turn preserve the integrity of the isolated loop. The isolated loop allows the movie film to be projected in a forward or backward mode. This is done by using two rocker arms. The righthand rocker arm functions in conjunction with the lefthand film position pin engaging in an aperture when the film is moving in a forward motion. The lefthand rocker arm functions in conjunction with the righthand sprocket pin in the aperture when the film is moving in a backward motion. One rocker arm and one sprocket pin are always in use and the other rocker arm and sprocket pin are always idle, when the film is in motion. This entire system is made possible because of the isolated film loop operating in conjunction with these rocker arms and sprocket pins. The fact that the sprocket pins are mounted on a plate that is adjustable in its relationship to the rocker arms, makes it possible for the image to be located properly on the fixed position screen.

Another object of this invention is to provide apparatus of the character described in which the arms for the reels are fixed and do not move back.

Still another object of this invention is to provide in apparatus of the character described, film aperture and image locating or positioning pins which are movable in order to index the image properly on the screen and in which the intermittent motion mechanism and optical assembly are an integral part of the housing.

Yet another object of this invention is to provide a device of the character described in which a projection lamp cover or housing is also an "on/off" switch and film guide for the idler gears, and in which the front portion of the housing contains the positioning devices for the condenser mechanism, the focusing lens and two of the mirrors of the optical system.

A further object of this invention is to provide a device of the character described in which the rear portion of the housing contains positioning devices for the third mirror of the optical system and the storage battery compartment.

A still further object of this invention is to provide in a device of the character described, a battery storage compartment that has pickup contacts for the electrical current on the front half of the housing while all other contacts are on the rear half of the housing and on the battery compartment door or cover, thereby eliminating the need for electrical interlock wiring between both halves of the housing.

Yet a further object of this invention is to provide a strong, rugged and durable device of the character described which shall be relatively inexpensive to manufacture, easy to assemble and ship and which shall yet be practical, easy to use, and efficient to a high degree.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the accompanying drawings in which is shown various illustrative embodiments of this invention, FIG. 1 is a front top perspective view of a film viewer/editor embodying the invention;

FIG. 2 is a front elevational view thereof;

FIG. 5 is a cross-sectional view taken on line 5—5 of FIG. 3;

FIG. 12 is a cross-sectional view taken on line 12—12 of FIG. 2;

FIG. 13 is a cross-sectional view taken on line 13—13 of FIG. 2;

FIG. 14 is a cross-sectional view taken on line 14—14 of FIG. 3; and

FIG. 15 is an exploded, perspective view of the batteries and their electrical contacts.

Figure 1:
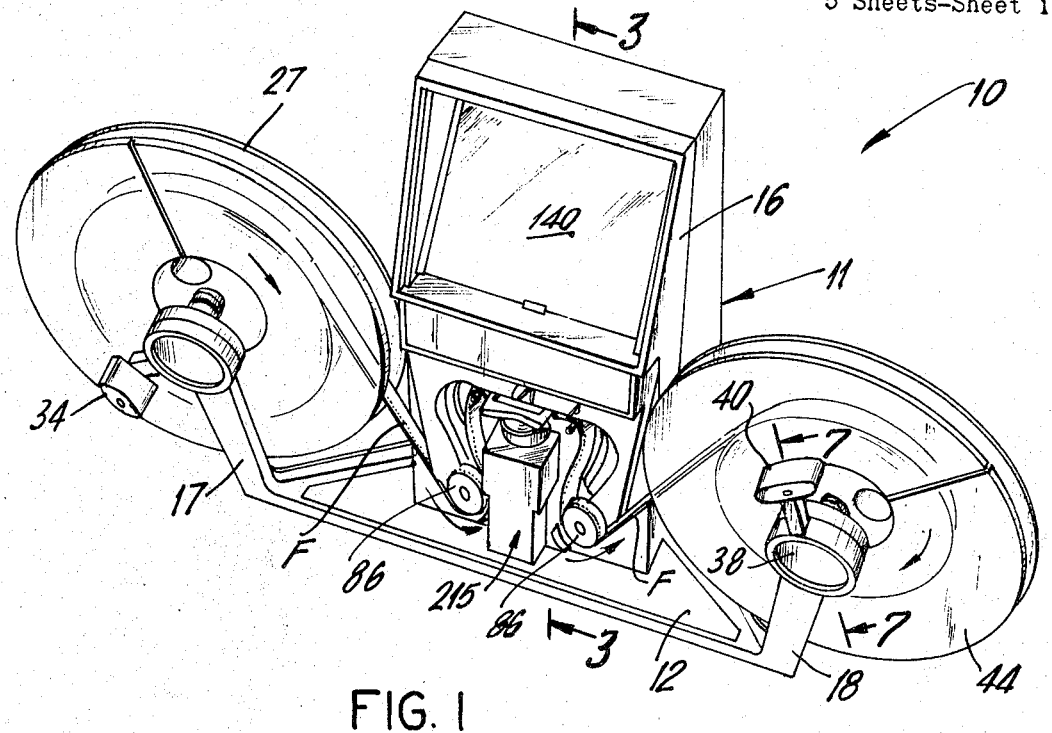
Figure 6:
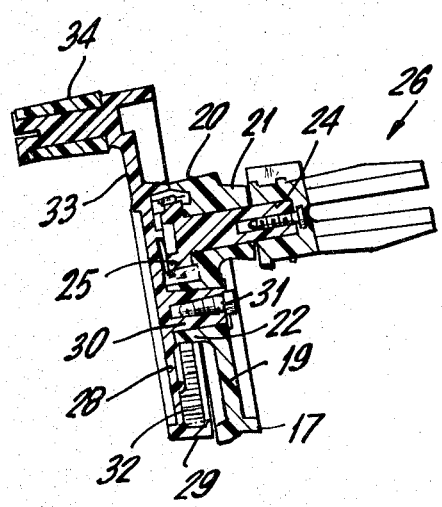
FIG. 6 is a cross-sectional view taken on line 6—6 of FIG. 2.
Figure 7:
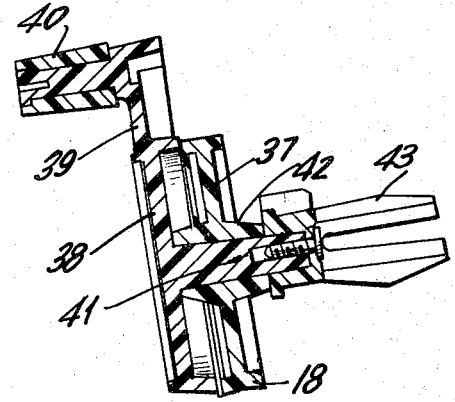
FIG. 7 is a cross-sectional view taken on line 7—7 of FIG. 1.
Figure 3:
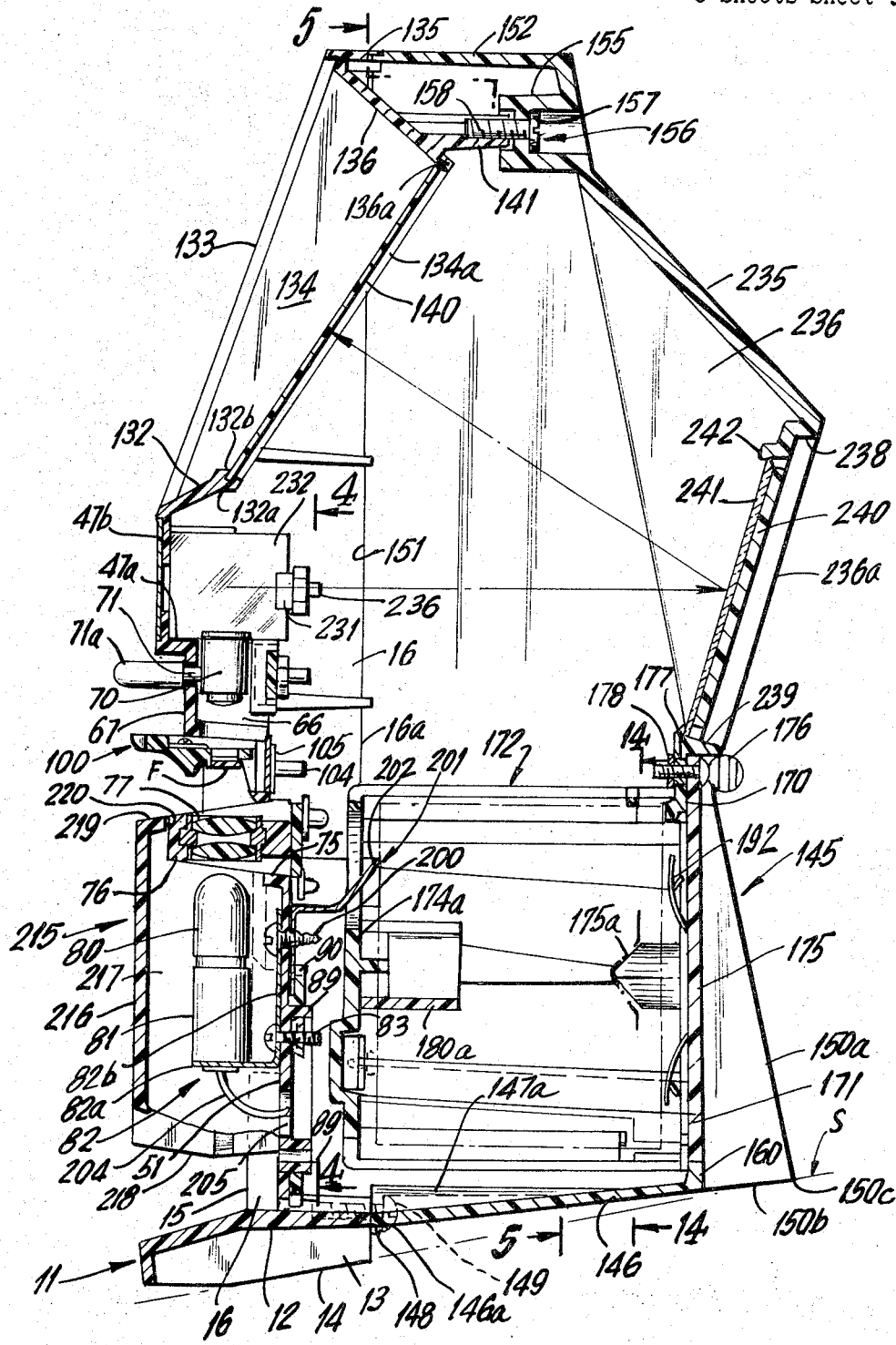
FIG. 3 is a cross-sectional view taken on line 3—3 of FIG. 1.

Referring now in detail to the drawing, 10 designates a moving picture film viewer/editor embodying the invention. Said device comprises a main body 11 which may be made of injection molded rigid plastic. Said body 11 comprises a bottom wall 12 from the underside of which a pair of transverse flanges 13 project downwardly and have lower edges 14 to rest on a horizontal surface S on which the device is supported. Extending upwardly from said bottom wall 12 is a front wall 15 which slopes upwardly and rearwardly relative to the bottom wall. At the sides of front wall 15 are side walls 16 in vertical planes. At the ends of the bottom wall, are upstanding arms or posts 17, 18. At the upper end of arm 17 is a circular disc 19 having a circular flange 20. Said disc 19 has an integral off-center hub or sleeve 21 projecting rearwardly and a central sleeve 22 projecting forwardly. Journalled in sleeve 21 is a shaft 24 projecting rearwardly beyond said sleeve. At the forward end of shaft 24 is a pinion 25. Attached to the projecting end of shaft 24 is a spring grip member 26 for a film reel 27. Rotatably mounted on disc 19 in coaxial relation thereto, is a rotary disc 28 having annular flange 29 and a central hub 30 rotatably mounted in sleeve 22. A screw 31 screwed to the center of hub 30 carries a washer contacting the rear of disc 19 to keep disc 28 in assembled relation therewith. Flange 29 has an internal gear 32 meshing with the pinion 25. Extending from flange 29 is an integral radial handle arm 33 on which a knob or handle 34 is rotatably mounted. Rotation of disc 28 causes faster rotation of the reel grip 26. On arm 18 (FIG. 7) is a circular integral disc 37 on which there is coaxially mounted a circular disc 38 provided with an integral radial arm 39 carrying a rotary knob or handle 40 at its outer end. Said disc 38 has a central shaft 41 journalled in a central sleeve 42 on disc 37, to rotatably mount disc 38 on disc 37. Shaft 41 extends rearwardly beyond sleeve 42. Attached to the extending end of said shaft 41 is a reel grip 43 on which a reel 44 can be mounted for rotation with the grip. It will now be understood that rotation of disc 38 will cause similar rotation of reel 44. To advance the film strip F from reel 27 to reel 44, disc 38 is rotated in a clockwise direction. To rewind, the disc 28 is rotated in a counterclockwise direction.

Side walls 16 have rear edges 16a. Bottom wall 12 has rearwardly and inwardly extending rear flanges 12a extending to the rear edges 16a of said side walls 16.

Front wall 15 is formed with a pair of forwardly projected oppositely curved side wall portions 46 and with still further forwardly projected wall portions 47 having a horizontal under shoulder 48 and inner side oppositely curved shoulders 49 disposed at the outer sides of wall portions 46. The raised wall 47 also has lower inwardly curved shoulders 48a and outer side walls 50.

Figures 9, 10:
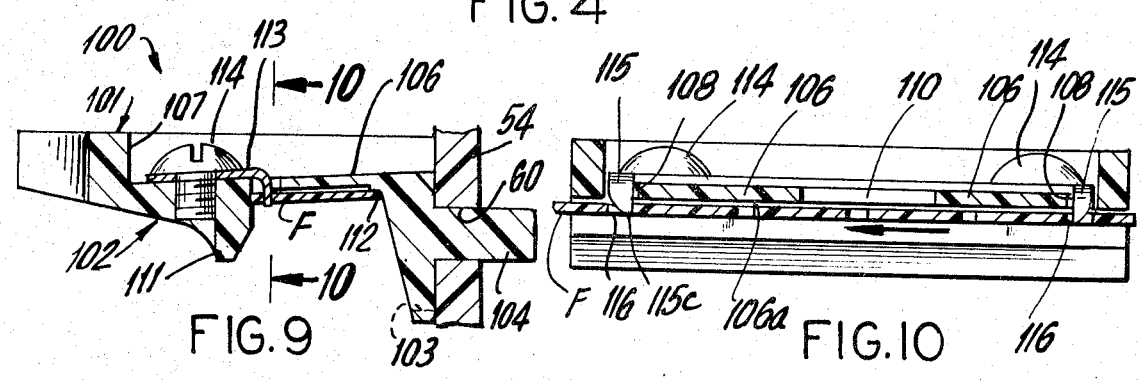
FIG. 9 is a cross-sectional view taken on line 9—9 of FIG. 8.
FIG. 10 is a cross-sectional view taken on line 10—10 of FIG. 9.
Figures 8, 11:
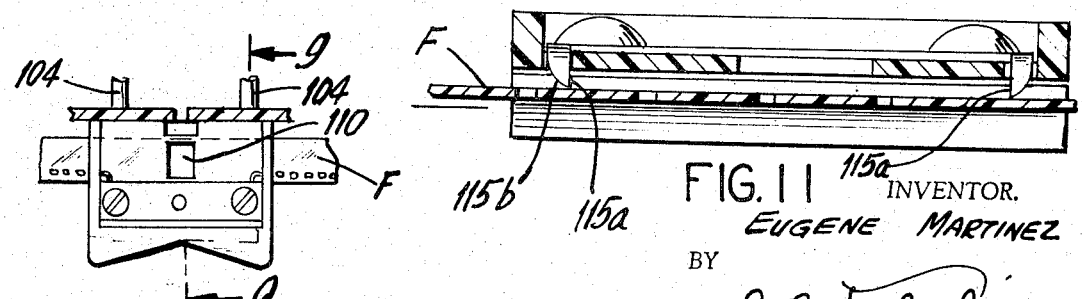
FIG. 8 is a cross-sectional view taken on line 8—8 of FIG. 2.
FIG. 11 is a view similar to FIG. 10 but showing the film moving in rewind direction.

At the middle of wall 15 is a rearwardly recessed vertical wall 51 having lower side walls 52 and upper side walls 53 spaced closer together to each other than side walls 52. At the upper end of wall 51 is a wall 54 in a plane more forward than wall 51. Wall 51 has vertical slots 55 and 56 near walls 52. Wall 15 has slots or notches 57, 58, vertically aligned with slots 56, 55 respectively and spaced vertically lower than said slots, thereby forming vertical guided slots 56a between the planes of walls 15 and 51, extending from the upper ends of slots 55, 56 to the lower ends of notches 58, 57 respectively for the purpose hereinafter explained. Wall 54 is formed with a pair of spaced horizontal slots 60 (FIG. 9) for the purpose hereinafter appearing.

Wall 54 has a vertical slot 62 leading up to a crossing notch 63 disposed below top wall 48. Top wall 48 extends rearwardly to wall 54. The central portion of wall 48 is cut out, as at 65. At opposite sides of the cut out 65 are parallel side walls 66 interconnected at the front by a semi-cylindrical wall 67 projecting at the front, forwardly of wall 47 (FIG. 2). Wall 67 is formed with an inclined slot 68. In the chamber formed by walls 66, 67 is a focusing lens assembly 70 to which a radial handle or pin 71 is fixed, said pin passing through said slot 68. Moving the pin to the left, looking at FIG. 2 will lower the lens assembly. Moving the pin to the right, looking at FIG. 2 will raise the lens assembly. The pin 71 has a cap 71a fitted thereon to contact wall 67.

Wall 51 is formed, above slots 55, with a transverse rectangular wedge shaped opening 75 located below wall 54. Fitted into said opening 75 is a condenser lens holder 76 projecting forwardly of wall 51, and carrying condenser lenses 77 coaxial with the lens assembly 70. A backing plate 78 is fixed to the rear surface of wall 51 by fasteners 78a to hold the lens holder 76 in place.

A lamp 80 is mounted on a lamp socket 81 fixed to an angular conductor bracket 82. Said bracket has a vertical arm 82b fixed to the front surface of wall 51 centrally thereof by a fastener 83. The lamp 80 projects upwardly and is located beneath the lenses 77 in coaxial relation thereto. The horizontal arm 82a of bracket 82 is electrically connected to the base of socket 81.

Wall 15 is provided with suitable bearings for shafts 85 projecting to opposite sides of wall 51 and below shoulders 48a. On said shafts, in front of wall 15 are sprocket wheels 86 for the film strip F. Fixed to said shafts 85 and located at the rear of wall 15 are discs 87 spaced rearwardly of wall 51. Said discs 87 carry pinions 88 at their inner sides. Extending rearwardly from wall 51, is a circular flange 89 on which is rotatably mounted a ring gear 90 meshing with the pinions 88. The discs 87 keep ring gear 90 from coming off flange 89. The film strip F coming off reel 27 passes under and around the adjacent sprocket wheel 86, then is looped up beneath horizontal shoulder 48 in spaced relation thereto, then passes down, under and around the other sprocket wheel 86 and then passes up to reel 44.

Sprocket wheels 86 are symmetrically disposed on opposite sides of wall 51.

Figure 4:
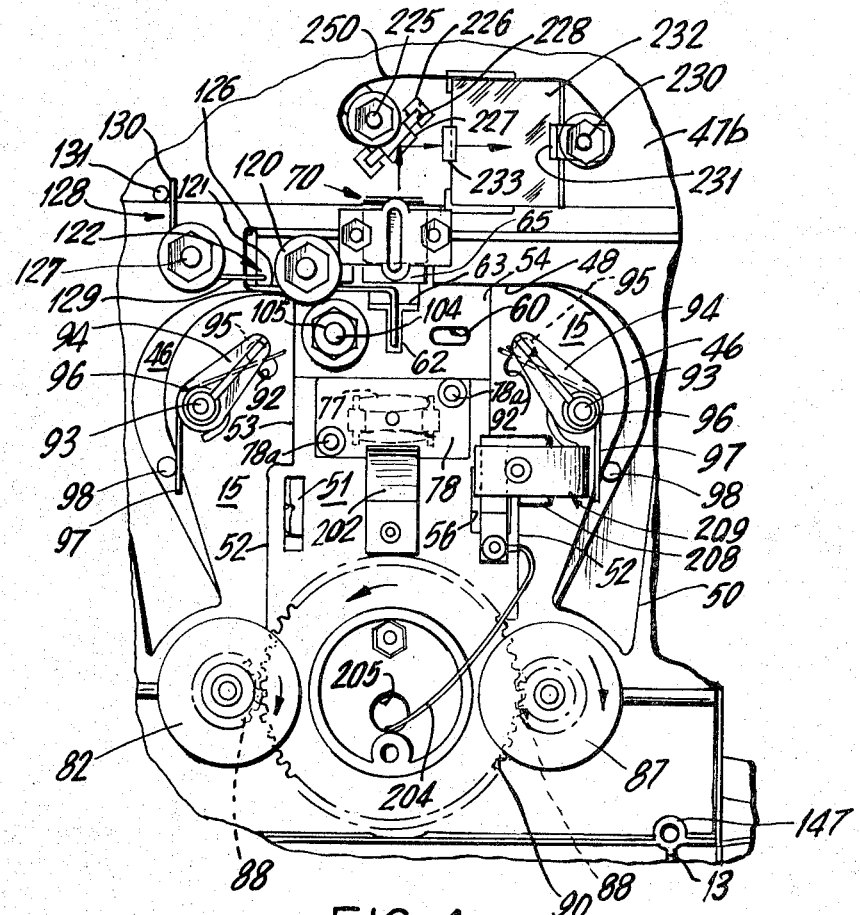
FIG. 4 is a cross-sectional view taken on line 4—4 of FIG. 3.

Wall 15 is formed with a pair of similar, symmetrical, upwardly and outwardly inclined slots 92. Pivoted to the rear side of wall 15 (see FIG. 4) as at 93, are upwardly and inwardly inclined rocker arms 94 having pins 95 at their upper free ends passing forwardly through slots 92. On pivotal shafts 93 are coil torsion springs 96 each having an end arm 97 engaging a pin 98 at the rear of wall 46 and a second end arm engaging pin 95. The torsion springs 96 tend to rotate the left arm 94 (FIG. 4) in a counter clockwise direction and the right arm 94 (FIG. 4) in a clockwise direction, to keep pins 95 at the upper ends of slots 92. The film strip F passes over the pins 95 which project forwardly of wall 15. The front ends of pins 95 are flanged annularly outwardly to keep the film strip from sliding off said pins. When the film is being moved and tensioned, arms 94 will be rotated inwardly to move pins 95 to the lower ends of slots 92. Means is provided to feed the film strip F, step by step, one frame at a time, whether the strip is being fed forwardly, to the right, looking at FIG. 2, or to the left looking at FIG. 2, in a rewind direction. To this end, there is provided a film strip framer member 100 (FIGS. 8-11). Said member 100 comprises a member 101 made of rigid plastic and having a generally horizontal forwardly extending portion 102 and a vertical downwardly extending flange 103. The rear surface of vertical flange 103 contacts the front surface of wall 54. Integrally formed with said rear flange 103, are a pair of rearwardly extending pins 104 passing rearwardly through slots 60. Fasteners 105 grip the rear ends of pins 104, but allow member 101 to be slidably moved to left or right to adjust its position, for the purpose hereinafter appearing. Said horizontal portion 102 has a depressed wall or portion 106 forming an inner vertical shoulder 107 at the front end of the depressed portion. Said depressed portion is formed with similar, symmetrical holes 108 at its right and left ends, equally in spaced relation with respect to shoulder 107. Said depressed wall or portion 106 has a central rectangular framing hole 110. Said horizontal portion 102 has a downwardly extending flange 111 and wall 106 is formed with an undercut or raised undersurface 106a on opposite sides of hole 110 forming front and rear abutments 112 at the rear and front sides of said undersurface. The film strip F passes beneath wall 106 and contacts the abutments 112 so as to be spaced somewhat from the undersurface 106a. The rear edge of strip F contacts the front face of flange 103. The front edge of strip F contacts the rear face of flange 111. Attached to the top of walls 106 as by screw 114, is a metal bar 113. The front edge of bar 113 is close to shoulder 107. Extending down from the ends of the rear edge of bar 113, are a pair of similar symmetrically disposed teeth 115 passing down through the holes 108. The The teeth 115 have inner vertical edges 115a and outer upwardly and outwardly curved edges 115b forming lower points 115c at the lower ends of said edges. The teeth 115 project down into sprocket holes 116 in film strip F. The opening formed by rectangular hole 110 is directly above the film strip and uncovers a frame of the film strip. When member 100 is moved sideways, it moves the film lengthwise to adjust the location of the projected frame. As the film is fed forwardly, by turning the arm 39 of the forward reel 44, the rocker arm 94 at the left side of FIG. 4, is swung down to pull the pin 95 at the right side of FIG. 2, downwardly to pull the film strip down off the tooth 115 at the right side of FIG. 2, thus allowing the film to slip off the rounded edge of tooth 115 at the left side of FIG. 2, and allowing the strip to move until the next sprocket opening 116 engages the straight edge 115a of the right tooth (looking at FIG. 2) to stop the film, momentarily or until further tensioning of the film by reason of forward feed again pulls the film off the straight edge 115a of the right tooth. This action is repeated to allow for stepped or intermittent feed of the film, one frame at a time. The sprocket holes 116 in the film are spaced to allow for step by step or intermittent feed.

When turning arm 33 of the rewind reel 27, the stepped feed of the film is in an opposite direction. This intermittent motion mechanism is possible because of the isolated film loop created by the two idler gears 86 connected by the third gear 90 thereby preserving a fixed length of film strip between both idler gears. It will be noted that one rocker arm 94 and one sprocket pin 115 are always in use and the other rocker arm and the other sprocket pin are always idle, when the film is in motion.

The adjustability of the member 100 in relation to the rocker arms makes it possible for the image to be located properly on a fixed position screen (which will be described hereinbelow).

The opening 110 is in line with the lamp 80, lenses 77 and focusing lens assembly 70.

It will be observed that member 100 is located above the lenses 77 and below the lens 70. At the upper end of wall 47 is a forwardly extending wall 47a from the forward end of which is provided an upwardly extending wall 47b. Walls 47a, 47b extend to shoulders 50 of wall 47. Means is provided to notch the film strip F. To this end there is fixed to the rear side of wall 15 a post or stud 120 projecting rearwardly therefrom and having means to support for oscillation, a horizontal portion 121 of a crank 122 made of wire rod stock. Said crank 122 has an arm 123 which normally is inclined downwardly and forwardly and passes through said vertical slot 62 in wall 54. At the lower end of arm 123 is an upwardly and forwardly upturned point 124 so positioned that when the crank 122 is rotated in a counterclockwise direction, looking at FIG. 12, the point 124 will notch the underside of the film F just thereabove. These notches are used for editing purposes. Arm 123 is at one end of horizontal portion 121 of the crank 122. Extending from the other end of said portion 121 is an arm 125 which projects forwardly through a vertical slot 126 in front wall 47. At the rear of wall 47 is fixed a pin 127 on which is mounted a coil torsion spring 128 having an end arm 129 pressing arm 125 downwardly, and another end arm 130 engaging a fixed pin 131 projecting rearwardly from a front wall 47b (which is disposed above walls 67 and 47). The torsion spring 128 normally depresses arm 125 since it biases the crank 122 in a clockwise direction, looking at FIG. 12, to keep point 124 spaced below the film F. To notch the film, the forward end of arm 125 which projects forwardly from wall 47, is moved up by a finger of the operator to notch the film. When the arm 125 is let go, the point 124 moves down and away from the film.

Side walls 16 extend above walls 50. Above wall 47b is an upwardly and rearwardly sloping wall 132. Above wall 132, side walls 16 have greater inclined front edges 133, from which inwardly sloping walls 134 extend. Interconnecting the upper ends of side walls 16 is a top transverse wall 135. Inclined downwardly and rearwardly from the underside of the front end of top wall 135, is a downwardly and rearwardly sloping wall 136. The rear edges 132a, 134a, 136a of walls 132, 134, 136 form a rectangular opening for a rectangular upwardly and rearwardly sloping flat screen 140 and provide a shouldered bezel for said screen. At the center of the rear edge of wall 132 is a tab 132b to hold the screen against the bezel. An abutment 136b at the center of the underside of wall 136 also holds the screen down on the shoulders of the bezel.

Extending rearwardly from the center of top wall 136 is an integral split tubular member 141 for the purpose hereinafter appearing. Attached to the rear side of front body portion 11 is a rear body portion 145 made of injection molded rigid plastic. Said body portion 145 comprises a bottom wall 146 having a front flanged edge 146a engaging a complementary flanged rear edge 12b of bottom wall 12 between the side walls 16. At the upper ends of flanges 13 are tubular portions 147. Bottom walls 146 of body portion 145 has half rounded upwardly recessed portions 147a forming rings 148 at their front ends. Screws 149 have heads contacting the rear sides of the rings, and shanks passing through the rings and screwed into said tubular portions to attach bodies 11, 145 together. Screws 149 may be self-tapping. Body 145 has side walls 150 having front flanged edges 151 engaging complementary rear flanged edges 16a of side walls 16 of body 11. The upper ends of side walls 150 are interconnected by a top wall 152. The rear ends of side walls 150 are interconnected by a rear wall 154. Extending rearwardly from the center of the upper portion of rear wall 154 is a countersunk tubular member 155. A screw 156 has a head 157 in the countersunk portion of tube 155 and a shank 158 screwed into split tube 141. Thus the body 145 is attached to body 11 by screws 149 and 156.

The bottom wall 146 has an upward extending flange 160 at its rear end disposed forwardly of the side walls 150. Said side walls 150 have rear edges 150a extending to lower rear edges 150b of said side walls, to form corners 150c. The viewer/editor 10 rests at its rear end on said points 150c.

The rear wall 154 of body 145 extends down to a level between the condenser lens 77 and the film framer member 100. Below said top wall is a forwardly recessed wall 170 in the plane of the rear surface of a shoulder 171 spaced forwardly of the rear surface of flange 160.

Extending forwardly from the lower end of wall 170 is a top wall 172 of a battery compartment 173. Extending rearwardly from the upper end of flange 160 is a bottom wall 174 of said battery compartment. Said top and bottom walls are connected by an integral front wall 174a. A rear cover or door 175 of non-conductive material fits against the rear surfaces of depressed walls 170, 171 and between the portions of side walls 150 which project rearwardly beyond the battery compartment. A thumb screw 176 on the rear door 175 passes through a hole 177 in wall 170 and screws to a metal plate 178 fixed in any suitable manner to the front surface of said wall 170, to removably attach said door to said battery compartment. Said battery compartment can accommodate six dry batteries in series circuit with the lamp base 81 and a switch, to be described hereinafter, in a top row of three parallel, coextensive batteries 179, 179a, 179b and a bottom row of three parallel, coextensive batteries 179c, 179d, 179e. To this end two round pegs 180a, 180b are fixed to the front wall and project rearwardly. Projecting forwardly from the inner side of rear cover 175, are a pair of cross-shaped pegs 175a, 175b, in alignment with pegs 180a, 180b, respectively.

The top wall 172 has three rounded top portions 172a, 172b, 172c. At the inside of side walls 150, midway between the top wall 172 and bottom wall 174, are shelves or ledges 181, 182. Battery 179 fits below curved wall portion 172a and rests on aligned pegs 180a, 175a and on shelf 181. Battery 179a fits below wall portion 172b and rests on aligned pegs 180a, 175a and aligned pegs 180b, 175b. Battery 179b fits below wall portion 172c and rests on aligned pegs 180b, 175b and shelf 182.

Bottom wall 174 comprises side curved ribs 183, 184 and spaced intermediate ribs 185, 186. Battery 179c rests on and between ribs 184, 186. Battery 179d rests on and between ribs 185, 186. Battery 179e rests on and between ribs 183, 185.

Attached to the rear surface of front wall 174a of the battery compartment, at its midportion, is a vertical conductor 190 having an upper spring finger 190a to contact the casing of battery 179 and a lower spring finger 190b to contact the anode of battery 179e. Also attached at its midportion to said wall 174a, is a horizontal conductor 191 having an inner spring finger 191a to to contact the casing of battery 179a, and an outer spring finger 191b to engage the anode of battery 179c.

It will be noted that batteries 179, 179b and 179d have their anodes facing rearwardly toward door 175 while batteries 179a, 179c and 169e have their anodes facing forwardly toward wall 174a and attached at its midportion to the inside of door 175 is a vertical conductor 192 having an upper spring finger 192a to engage the anode of battery 179b and a lower spring finger to engage the casing of battery 179c. Also attached at its midportion to the inside of the door 175, is a conductor 193 extending in a horizontal direction, and having a spring finger 193a to engage the anode of battery 179, and a spring finger 193b to engage the casing of battery 179e. Still another horizontal conductor 194 is attached at its midportion to the door 175. Conductor 194 is spaced below conductor 193. It has a spring finger 194a to engage the casing of battery 179e and a spring finger 194b to engage the anode of battery 179d.

Arm 82b of bracket 82 is electrically connected by a conductor screw 200 to an arm of a spring contact member 201. The screw 200 passes through wall 51. The contact member 201 is at the rear surface of wall 51 and has a spring finger 202 to contact the anode of battery 179a.

Electrically connected to the central contact of the lamp base in socket 81, is a wire 204 which passes through an opening 205 in said wall 51.

Attached to the rear side of wall 51 is a vertical contact member 206 having an intermediate forwardly curved hump portion 207 projecting through slot 56 in wall 51 and into slot 56a, between walls 15, 51, for the purpose hereinafter appearing. Extending from hump 207 is a flat finger 207a. Attached to an extension 208 of rear wall 51 is a horizontal conductor or contact member 209 having a finger 210 adapted to be engaged by finger 207a when the hump portion 207 is pushed rearwardly by means to be explained hereinafter. Contact member 209 also has a spring finger 211 to contact the casing of battery 179b.

It will now be understood that when hump 207 is pushed rearwardly, the lamp will be in series circuit with the batteries through contact 209, battery 179b, conductor 192, battery 179c, conductor 191, battery 179d, conductor 194, battery 179e, conductor 190, battery 179, conductor 193, battery 179a, contact member 201, screw 200, bracket 82, the lamp base in socket 81, the lamp 81, the central contact of the lamp base, wire 204 and conductor 206. When the hump 207 is out of contact with respect to spring finger 210, the circuit is broken and the lamp is deenergized. A lamp housing 215 is mounted for sliding movement up and down on the front side of wall 15 and has means to push hump 207, to move finger 207a into engagement with spring finger 210 when the housing is slid up, and to allow the hump 207 to normally self-retract to move finger 207a away from spring finger 210, and break the circuit, when the housing is pushed down.

Said housing 215 has a front wall 216 spaced forwardly away from wall 51. Said housing also has side walls 217, a bottom wall 218 and a top wall 219. Said top wall has an opening 220 into which the condenser lens assembly 76 slidably fits.

The rear open side of the housing 215 lies between the side walls 52, 53 and against the front side of wall 51. Extending outwardly from rear edges of side walls 217, are guide rings 220a which slide in slots 56a between flanges of walls 15 and 51. Thus, the lamp housing can be slidably moved up and down. When the housing is down, wings 220a are spaced below hump 207, and the circuit is open. When the sides of the housing are pinched together and the housing is slid up, the hump 207 is pressed rearwardly to cause finger 207a to engage finger 210, to close the circuit and illuminate the lamp.

Lamp housing 215 also has wings 221 extending outwardly from the lower ends of its side walls and contacting the front surfaces of wall 15. When the lamp is "on" wings 221 hold the film from falling off the sprocket wheels. Said wings have curved upper edges 221a which are close to the outer periphery of said wheels.

Means is provided to reflect the images on the film strip F from the focusing lens assembly to the screen 140. To this end there is integrally formed with the rear side of wall 47b of body 11, a rearwardly projecting stud 225 and a grooved holder 226 which is inclined at an angle of 45° upwardly and to the right, looking at FIG. 4. Fixed to the rear end of stud 225 is a clip 227 engaging the rear edge of a rectangular mirror 228. The front edge of said mirror is received in the holder 226. Said mirror 228 is disposed directly above the focusing lens assembly 70 and reflects the image to the right, looking at FIG. 4.

Also integrally formed with the wall 47b is a stud 230 projecting rearwardly and located to the right of mirror 228, looking at FIG. 4. At the rear end of post 230 is a clip 231 engaging the rear edge of a rectangular mirror 232 which slants rearwardly and to the right, looking at FIG. 4. The forward edge of mirror 232 engages a clip 233 integrally formed at the rear side of wall 47b. The mirror 232 slopes upwardly and rearwardly somewhat. Since it is offset from the middle of the body it slants somewhat less than 45° to a vertical transverse plane to reflect the image from the first mirror rearwardly into the body member 145 and toward the middle of the body. The rear wall 154 of body member 145 is formed with an integral rearwardly and downwardly steeply sloping wall 235 and with rearwardly and inwardly sloping side walls 236. Walls 236 are substantially triangular in shape and extend down to the level of the upper end of wall 170. At the lower end of wall 235 is a horizontal wall 238 projecting forwardly. At the lower ends of walls 236 is a horizontal flange 239. The walls 238, the flange 239 and the insides of walls 236, adjacent the rear edges 236a thereof, are interconnected by a wall 240 which slopes upwardly and rearwardly relative to cover 175, and also slopes somewhat forwardly to the right, looking at FIG. 5, to direct the image back toward the middle of the body. Attached to the inside of wall 240 is a rectangular mirror 241. The angle of mirror 241 is such as to reflect the image received from mirror 232, onto screen 140. The angles of mirrors 232 and 241 are such that the mirror 232 will reflect the image from mirror 228 to the mirror 241. Wall 240 has at its front or inner side a bezel 242 to engage edges of mirror 241.

To replace a lamp 80, pinch the sides of the lamp housing together with thumb and forefinger. At the same time, push down and pull out to remove the lamp housing. The wings 220a will move out of notches 57, 58. Then push down the lamp relative to socket and twist the lamp out of the socket. Then a new lamp can be mounted on the socket and the lamp housing replaced. When the lamp is "on," the wings 221 of the lamp housing helps to keep the film loop in place. To facilitate removal of the film from its path, push down the lamp housing to allow the film to move away from the sprocket wheels.

When threading the film, a generous loop at the rocker pins should be allowed.

The door 175 is parallel to wall 15 and hence also slopes upwardly and rearwardly, when the apparatus is on a horizontal surface. The reels 27 and 44 are in vertical planes and rotate on horizontal axes. The sprocket wheels 86 rotate on axes inclined downwardly and rearwardly. The position of the reels is such as to allow the film to track on the sprocket wheels properly, with the film plane sloping backwardly and downwardly. Thus, the spacing of the reels from the idler gears allows a change of the film plane as the film moves from the reels to the sprocket wheels.

It will be observed that the idler gears isolate the film loop, the length of which remains constant. The image can be properly indexed on the screen by adjusting the framer member 100 sideways.

The intermittent motion mechanism and optical assembly are an integral part of the housing or body 11, 145.

The front body portion 11 carries the positioning devices for the condenser mechanism, the focusing lens and the two mirrors 228, 232 of the optical system.

The rear body portion 145 carries the positioning devices for the third mirror 241 of the optical system and the battery storage compartment.

The projection lamp cover or housing 215 is also the "on/off" switch. It is also the film guide for the idler gears since the film passes between the sprocket wheels and the lamp housing.

The battery storage compartment, it will now be understood, is so constructed that the pickup contacts 201, 206 for the electric circuit, are on the front body 11 of the housing, while all other contacts are on the rear body 145, and on the battery compartment cover 175, thereby eliminating the need for electrical wiring between both parts 11, 145 of the housing.

The screw 156 may be a self-tapping screw. This device 10 is portable. There are no electric line cords to worry about. Images can be viewed comfortably in a normally lighted room. The screen 140 may be 3" x 4" in dimension.

Electrical tape 250 may be attached to and between studs 225, 230 to cover the mirrors 228, 232 and act as a light shield for said mirrors.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A moving picture film viewer/editor comprising a wall, a condenser lens assembly on said wall, a lamp on said wall aligned with said lens assembly and located on one side thereof, a film framer means on said wall aligned with said lens assembly and located on the other side thereof, a focusing lens on said wall aligned with said film frames means said film frames means being located between said lens assembly and said focusing lens, electrical means to energize said lamp, an "on-off" switch interposed in said electrical means, a cover for said lamp, movably mounted on said wall, and means controlled by movement of said cover to actuate said switch.

2. The combination of claim 1, means to move a moving picture film strip past said framer means, said framer means having means to engage sprocket holes in said moving picture film strip and means to mount said framer means on said wall, for adjustment in the direction of movement of the film strip past said framer means.

3. The combination of claim 1, said framer means having an aperture adapted to register with a frame of a film strip and being provided with a pair of teeth to engage a pair of sprocket holes in said film, said teeth having straight inner edges and upwardly and outwardly curved outer edges.

4. The combination of claim 3, rocker arms pivoted to said wall and disposed on opposite sides of said framer means; means to bias the free ends of said rocker arms away from each other, and means on said free ends of said rocker arms to engage the film strip at opposite sides of said framer means.

5. The combination of claim 1, sprocket wheels mounted for rotation on said wall and disposed at opposite sides of said lamp cover, pinions fixed to rotate with said sprocket wheels, gear means meshing with said pinions to rotate said pinions in the same direction, said film strip being adapted to be engaged around said sprocket wheels and looped between said sprocket wheels and adjacent said framer means, whereby the length of the loop between said sprocket wheels remains constant.

6. The combination of claim 5, spring pressed means mounted on said wall to engage the film strip loop on opposite sides of said framer means, said framer means having an aperture to register with a frame of said film strip, and teeth to engage in sprocket holes in the film strip.

7. The combination of claim 6, and means to mount said framer means on said wall for adjustment.

8. The combination of claim 1, a first mirror on said wall to reflect an image from the focusing lens to one side, a second mirror on said wall to reflect an image from the first mirror, rearwardly of said wall, a casing comprising said wall, said wall being the front wall of said casing, a third mirror at the rear of the casing, to reflect an image from the second mirror, upwardly and forwardly, and a screen on said front wall and above said first mirror to receive the image from the third mirror.

9. The combination of claim 8, said screen sloping upwardly and rearwardly.

10. The combination of claim 1, a casing comprising a front casing portion and a rear casing portion, said wall being the front wall of said front casing portion, means to attach said casing portions together, and said switch comprising a first switch element on said front casing portion and a second switch element on said front casing portion, and said lamp cover having means to move one switch element against said other switch element.

11. The combination of claim 10, a battery compartment in the rear casing portion having means to support a plurality of batteries, means in the compartment to connect said plurality of batteries in series circuit, and said electrical means including a contact on said front wall in position to engage one electrical end of said series, connected batteries when said casing portions are attached together, and one of said switch elements being positioned to engage the other electrical end of said series connected batteries when said casing portions are attached together.

12. The combination of claim 1, and said means controlled by said cover to actuate said switch, comprising means on said cover to move one switch element of the switch into contact with said other switch element of the switch when said lamp cover is moved to one position, said switch elements of said switch being normally out of engagement when said cover is in another position thereof.

13. The combination of claim 1, sprocket wheels mounted for rotation on said wall and disposed at opposite sides of said lamp cover, pinions fixed to rotate with said sprocket wheels, gear means meshing with said pinions to rotate said pinions in the same direction, said film strip being adapted to be engaged around said sprocket wheels and looped between said sprocket wheels and adjacent said framer means, whereby the length of the loop between said sprocket wheels remains constant, said lamp cover comprising wings having curved edges movable close to said sprocket wheels to keep the film from falling off the sprocket wheels, when the lamp cover is moved to switch "on" position.

14. The combination of claim 1, a casing comprising a front casing portion, a rear casing portion, means to attach said rear casing portion to the front casing portion, said wall being the front wall of said front casing portion, a first mirror on said front wall and located above said focusing lens, to reflect an image from the focusing lens, sideways, a second mirror on said front wall to reflect an image from the first mirror, rearwardly, a third mirror on said rear casing portion to reflect an image from the second mirror, upwardly and forwardly, and a screen located on the first casing portion and above the first mirror, to receive an image reflected by said third mirror.

15. The combination of claim 14, said rear casing portion being formed with a battery compartment located below said third mirror, a door to close the rear of said compartment, said compartment having means to accommodate a plurality of coextensive batteries in parallel relation, said compartment having a front compartment wall in opposed relation to said door, means on said front compartment wall and on said door to connect batteries in said compartment in series circuit, and means including said switch to connect said lamp in series circuit with batteries in said compartment upon attaching said front and rear casing portions together.

16. The combination of claim 15, sprocket wheels rotatably mounted on the front wall of said front casing portion, and gear means connecting said sprocket wheels for rotation in the same direction.

17. The combination of claim 16, upwardly spring pressed means to engage a film looped between said sprocket wheels, and said framer means having a pair of teeth to engage in sprocket holes in said film strip, said teeth having vertical inner edges and curved outer edges.

18. The combination of claim 17, and means to mount said framer means on said front casing portion, for sidewise adjustment.

19. A moving picture film viewer/editor comprising a casing having a wall, a framer means, means to mount said framer means on said wall of said casing, a pair of spaced symmetrical sprocket wheels, rotatably mounted on said wall, a pinion fixed to each wheel for rotation therewith, gear means meshing with said pinions for rotating said wheels in the same direction, a pair of spring pressed members to engage a moving picture film strip on opposite sides of said framer, means with said film passing around said sprocket wheels, and looped over said spring pressed members and adjacent said framer means.

20. The combination of claim 19, said framer means having a pair of downwardly extending teeth to engage sprocket holes in said film strip, said teeth having inner vertical edges and upwardly and outwardly curved outer edges.

21. The combination of claim 20, means to mount said framer means on said wall of said casing comprising means to mount said framer means for side to side adjusting movement.

22. A moving picture film viewer/editor comprising a casing having a front casing portion, a rear casing portion fixed to the rear side of said front casing portion, said front casing portion having a front wall, a condenser lens assembly at the front of said wall, a lamp on said wall and below said condenser lens assembly, a film framer means on said front wall and above said condenser lens assembly, a focusing lens assembly on said front wall and above said framer means, and coaxial with respect to said condenser lens assembly, and means manually operable from the front of said front wall to adjust the height of said focusing lens assembly above said condenser lens assembly.

23. The combination of claim 22, a mirror at the rear of said front wall to reflect an image from the film to one side, a second mirror mounted on the rear casing portion for reflecting an image from the first mirror, rearwardly and toward the middle of the casing, a third mirror at the inside of the rear casing portion to reflect an image from the second mirror, upwardly and forwardly, and a screen on said first casing portion and above the first mirror, to receive an image from the third mirror.

24. The combination of claim 23, battery actuated circuit means in the rear casing portion, circuit means for the lamp in the front casing portion, means to connect the circuit means on said front casing portion to the circuit means on the rear casing portion, upon attaching said casing portions together.

25. The combination of claim 24, the circuit means on said front casing portion including a switch, and means on said front casing portion and operable manually from the front of said front casing portion, to activate said switch.

26. The combination of claim 22 and means operable from the front of said front casing portion to notch frames of film disposed below said framer.

27. A viewer/editor comprising a casing having a pair of casing portions, means for attaching said casing portions together, a condenser lens, a focusing lens and a lamp on one of said casing portions, battery operated circuit means on said other casing portion, and means to electrically connect said circuit means with said lamp upon attaching said casing portions together, an "on-off" switch means for said lamp, on said one of said casing portions, and a lamp cover on said one of said casing portions having means to actuate said lamp switch means.

28. The combination of claim 27, a framer means for a film strip on said one of said casing portions, said means on said one of said casing portions and operable from the front of said one of said casing portions, to notch the film strip at said framer means.

29. The combination of claim 28, and means operable from the front of said one of said casing portions to move said focusing lens toward and away from said framer means.

30. A viewer/editor comprising a casing having a front wall sloping upwardly and rearwardly, a pair of sprocket wheels mounted on said front wall for rotation on parallel axes sloping downwardly and rearwardly and at right angles to said front wall, means to mount a pair of moving picture film strip reels for rotation on horizontal axes disposed outwardly of the axes of rotation of said sprocket wheels and thereabove, and in a vertical plane disposed forwardly of said sprocket wheels, said sprocket wheels being disposed in front of said front wall, pinions fixed to said sprocket wheels for rotation therewith, and disposed in back of said front wall, and a gear in back of said front wall and meshing with said pinions.

31. The combination of claim 30, a lamp mounted on said front wall, a lamp cover mounted for sliding movement at the front of said front wall and between said sprocket wheels, electric circuit means to energize said lamp, a switch in said circuit means, and means on said lamp cover to actuate said switch means.

32. The combination of claim 30, the means for supporting said reels comprising arms fixed to said casing and extending outwardly of the sides of said casing.

References Cited

UNITED STATES PATENTS

| | | | |
|---|---|---|---|
| 3,507,569 | 4/1970 | Goto | 352—129 |
| 2,906,167 | 9/1959 | Castedello et al. | 352—129 X |
| 3,447,866 | 6/1969 | Heisler | 352—129 X |

SAMUEL S. MATTHEWS, Primary Examiner

R. L. MOSES, Assistant Examiner

U.S. Cl. X.R.

352—104; 353—77